Patented Feb. 23, 1954

2,670,363

UNITED STATES PATENT OFFICE 2,670,363

PREPARATION OF TITANIUM CHLORIDE ACETATE POWDER MATERIAL

John P. Wadington, Keyport, N. J., assignor to National Lead Company, New York, N. Y., a corporation of New Jersey No Drawing. Application February 21, 1952, Serial No. 272,894

3 Claims. (Cl. 260—429)

This invention relates to the production of titanium chloride acetate composition. More particularly, it relates to the production of titanium chloride acetate powder material by a new and novel process.

Titanium chloride acetate compositions and their method of manufacture previously have been described in the literature. These methods, however, are restricted to liquid phase reactions wherein liquid glacial acetic acid and liquid titanium tetrachloride are mixed together in order to produce a crystalline product of titanium chloride acetate composition. A method typical of those known in the art is more fully described in Zeitschrift Für Anorganische Chemie (1925), vol 143, pp. 383–393.

The prior art methods for producing titanium chloride acetate compositions are, in general, characterised by the necessity of employing a large number of processing steps in order to obtain complete separation between the crystalline titanium chloride acetate composition and the hydrogen chloride which forms as a by-product of the reaction between titanium tetrachloride and acetic acid. For example, when reacting precisely the stoichiometric quantities of liquid titanium tetrachloride and liquid glacial acetic acid required to produce titanium dichloride diacetate composition, a glutinous mass comprising titanium dichloride diacetate product and hydrogen chloride is obtained. In order to drive off the hydrogen chloride, it is necessary to apply heat to this glutinous mass and, particularly on a commercial scale, it is practically impossible to provide sufficient heat to remove the hydrogen chloride completely without damage to or destruction of the titanium chloride acetate. The use of either a substantial excess of acetic acid or employment of other suitable inactive liquid reaction media, such as for example, carbon tetrachloride or chloroform, tends to prevent the formation of such a glutinous reaction mass and thus the hydrogen chloride may be more easily removed from the titanium chloride acetate composition; however, the yield of titanium chloride acetate composition is generally reduced when such liquid reaction media are employed. Furthermore, it then becomes necessary to include several additional processing steps such as filtration, washing, and drying in order to obtain the final product. The use of either glacial acetic acid or other inactive liquid reaction media in combination with the additional processing steps obviously increases the overall cost in obtaining the titanium chloride acetate product.

An object of this invention, therefore, is to provide a direct method for the preparation of titanium chloride acetate composition wherein the titanium chloride acetate composition may be easily separated from the hydrogen chloride by-product. Another object is to provide a direct method for the preparation of titanium chloride acetate in which employment of either an excess of reagents or an additional inactive liquid reaction medium is avoided. A still further object of the instant invention is to provide a method for the preparation of titanium chloride acetate powder material which is simple and economical to utilize and by which an anhydrous product may be continuously and directly obtained. These and other objects of the instant invention will become apparent in the following more complete description.

This invention contemplates a process for producing titanium chloride acetate powder material which comprises preheating titanium tetrachloride and glacial acetic acid to the vapor state, mixing and reacting said vapors in a reaction zone at a temperature of at least 136° C. but not in excess of about 170° C. removing the gaseous hydrogen chloride from the reaction zone and collecting the so-formed titanium chloride acetate powder material. The titanium chloride acetate product is collected in the form of a fine yellow powder which is easily handled and which is stable when stored under anhydrous conditions.

Reaction in the "vapor state" or "vapor phase" shall be understood to denote a process wherein two or more constituents are reacted while each constituent is in the form of a gas or vapor as distinguished from its solid or liquid state.

According to the process of the instant invention, titanium tetrachloride and glacial acetic acid are preheated, preferably separately, to the vapor state. Vaporizing apparatus which are suitable for this operation are well known in the art. The vapors are then mixed in a reaction zone to form titanium chloride acetate powder material and gaseous hydrogen chloride. The temperature at which the reaction zone is maintained is sufficient to prevent the hydrogen chloride vapor from being adsorbed on the powder material, and, thus, the solid titanium chloride acetate composition is immediately and completely separated from the volatile hydrogen chloride, and the hydrogen chloride is removed from the reaction zone through suitable vents which may be provided in the walls of the reactor.

Although the titanium tetrachloride and glacial acetic acid vapors may be mixed in substantially any proportions according to the process of the instant invention, it has been found that the titanium chloride acetate powder which is formed will always substantially approximate the composition of titanium dichloride diacetate, $TiCl_2(OCOCH_3)_2$. Any excess of either acetic acid vapor or titanium chloride vapor will be removed with the volatile hydrogen chloride. In actual practice, however, it is preferred to employ approximately stoichiometric proportions of each reactant, that is about 2 moles of glacial acetic acid for each mole of titanium tetrachloride used.

With respect to reaction zone temperatures employed in the instant invention, it is necessary to operate at temperatures sufficiently high to maintain the reaction in the vapor state, that is temperatures of at least 136° C. However, it is desirable to employ temperatures not in excess of 170° C. and in actual practice temperatures of about 150° C. and lower are preferred. Higher operating temperatures than 170° C. should be avoided since they tend to cause decomposition of the titanium dichloride diacetate powder material. Obviously the temperatures employed may be varied from those stated above by the application of pressure or vacuum according to principles well known to the art.

In order to illustrate more clearly the process of the instant invention, the following examples are presented:

Example I

Titanium dichloride diacetate powder material was prepared as follows:

Liquid anhydrous titanium tetrachloride was pumped from a reservoir to a vaporizing apparatus where it was vaporized and the titanium tetrachloride vapor was then introduced into a reaction zone at the rate of about 2.9 parts per minute. Simultaneously, glacial acetic acid was likewise vaporized and metered into the reaction zone at the rate of 1.8 parts per minute. A temperature of about 140° C. was maintained in the reaction zone throughout the operation. The vaporized titanium tetrachloride and glacial acetic acid reacted substantially instantaneously with one another to yield a yellow chloride acetate anhydrous powder which collected at the bottom of the reaction zone. Simultaneously hydrogen chloride vapor which was formed as a by-product of the reaction separated from the solid titanium dichloride diacetate powder product and was vented from the top of the reaction zone. The reaction was continued for a period of two hours and a total yield of approximately 394 grams of titanium chloride acetate powder material was collected. This material was analyzed chemically and found to have a composition corresponding substantially to that of titanium dichloride diacetate.

The material formed in this example was used to produce rutile titanium dioxide pigment by heating it to 850° C. in the presence of air. The rutile titanium dioxide pigment so prepared was employed in the manufacture of paints.

Example II

The process described in Example I was repeated except that 2.7 parts of acetic acid vapor were introduced into the reaction zone for each part of titanium tetrachloride vapor. This amount of acetic acid was about 4 times the stoichiometric amount necessary to form titanium dichloride diacetate. Again a yellow powder material was formed which collected at the bottom of the reaction zone, and the gaseous hydrogen chloride was vented from the top. The excess and unreacted portion of acetic acid vapor was recovered with the hydrogen chloride by-product. The powder was analyzed and even though a large excess of acetic acid had been employed, the material was found to be substantially titanium dichloride diacetate like that formed in Example I. The titanium dichloride diacetate powder prepared in this manner was stored under relatively anhydrous conditions and was still in a stable form after one year storage. The yield of titanium dichloride diacetate in this example indicated substantially complete conversion of the titanium values to titanium dichloride diacetate.

In order to compare the prior art methods for producing titanium chloride acetate compositions with that of the instant invention, the following runs were also conducted:

Liquid glacial acetic acid and liquid titanium tetrachloride were reacted in proportions substantially identical to those employed in Example I, i. e. about 2.7 parts titanium tetrachloride to about 1.8 parts glacial acetic acid. These proportions approximate those required to produce titanium dichloride diacetate composition without employing an excess of either reagent. The glacial acetic acid was cooled to about 18° C., and the liquid titanium tetrachloride was added slowly to the acetic acid. The mixture was agitated as much as possible during the addition of the titanium tetrachloride. The reaction was observed to be exothermic, and a glutinous mass was formed substantially immediately. This glutinous mass, which was extremely viscous, was composed of solid titanium chloride acetate composition, acetic acid and hydrogen chloride. The glutinous mass was then heated in an attempt to drive off the hydrogen chloride, but due to the viscous nature of the reaction mass, separation could not be accomplished, and instead the titanium chloride acetate began to decompose.

Another run was conducted wherein liquid glacial acetic acid and liquid titanium tetrachloride were reacted, the glacial acetic acid being present in amount 4 times that necessary to form titanium dichloride diacetate with the titanium values present. The liquids were admixed, and the resulting solution was heated with agitation for a period of about 15 minutes. A large number of pale yellow, titanium chloride acetate crystals was quickly formed, and these crystals settled at the bottom of the reaction container. The solution containing the crystalline product was then further heated at a temperature of about 70–80° C. in order to drive off the hydrogen chloride by-product. The solution was then filtered in order to separate the excess acetic acid from the crystalline product, and the crystals were then washed with more acetic acid to remove the remaining hydrogen chloride and with petroleum ether to remove the acetic acid. The product was dried and weighed. Chemical analysis showed the composition to be substantially that of titanium dichloride diacetate, however, the yield was considerably less than that obtained in Example II when employing the same reacting proportions in the vapor phase method according to the instant invention.

It has been shown by the description of the instant invention and by the examples presented that titanium chloride acetate compositions may be directly prepared by the vapor phase reaction between titanium tetrachloride and glacial acetic acid. Furthermore, it has been demonstrated that the process of the instant invention provides a simple and economical method whereby a substantially quantitative yield of anhydrous and relatively stable titanium dichloride diacetate powder material is obtained. It has been clearly shown that by utilization of the method of the instant invention it is unnecessary to employ either excess quantities of reactants such as liquid glacial acetic acid or other material so as to provide a liquid reaction medium in order to facilitate separation between the hydrogen chloride and the titanium dichloride diacetate powder material.

While this invention has been described and illustrated by the examples shown, it is not intended to be strictly limited thereto and other modifications and variations may be employed within the scope of the following claims.

I claim:

1. In a process for producing titanium dichloride diacetate powder material the steps which comprise preheating titanium tetrachloride and glacial acetic acid to the vapor state, and reacting said vapors in a reaction zone at a temperature of at least 136° C. but not in excess of about 170° C., removing the gaseous hydrogen chloride from the reaction zone, and collecting the so-formed titanium dichloride diacetate powder material, said titanium dichloride diacetate powder material being substantially free of by-product hydrogen chloride.

2. Method according to claim 1 in which said temperature is from 136° C. to 150° C.

3. Method according to claim 1 in which substantially 2 moles of glacial acetic acid are present for each mole of titanium tetrachloride.

JOHN P. WADINGTON.

References Cited in the file of this patent

UNITED STATES PATENTS

| Number | Name | Date |
|---|---|---|
| 1,612,131 | Kraus et al. | Dec. 28, 1926 |
| 2,446,897 | Young et al. | Aug. 10, 1948 |

FOREIGN PATENTS

| Number | Country | Date |
|---|---|---|
| 435,110 | Great Britain | Sept. 16, 1935 |

OTHER REFERENCES

Groggins: Unit Processes in Organic Synthesis, 3rd edition. Pages 481–483, 578, 670. McGraw-Hill Book Co. Inc., New York, 1947.